(12) United States Patent
Mukai et al.

(10) Patent No.: US 12,038,124 B2
(45) Date of Patent: Jul. 16, 2024

(54) STAND FOR DEVICE

(71) Applicant: CASIO COMPUTER CO., LTD., Tokyo (JP)

(72) Inventors: Junji Mukai, Yao (JP); Jumpei Ishibashi, Nishitokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/885,416

(22) Filed: Aug. 10, 2022

(65) Prior Publication Data
US 2023/0068344 A1 Mar. 2, 2023

(30) Foreign Application Priority Data
Aug. 30, 2021 (JP) ................................. 2021-139594

(51) Int. Cl.
*F16M 11/14* (2006.01)
(52) U.S. Cl.
CPC ....... *F16M 11/14* (2013.01); *F16M 2200/041* (2013.01); *F16M 2200/066* (2013.01)
(58) Field of Classification Search
CPC ............. F16M 11/14; F16M 2200/041; F16M 2200/066; F16M 11/2021; F16M 11/10;
(Continued)

(56) References Cited

U.S. PATENT DOCUMENTS 3,866,547 A * 2/1975 Guyton .................... A47B 5/06
108/38
5,192,963 A * 3/1993 Hill ........................ F16M 11/42
396/428
(Continued)

FOREIGN PATENT DOCUMENTS

CN 212960664 U * 4/2021
CN 213685979 U 7/2021
(Continued)

OTHER PUBLICATIONS

Chromlives camera handle grip for support mount on camera stabilizer sold on amazon dated Jun. 22, 2017, https://www.amazon.com/ChromLives-Handle-Grip-Handlegrip-Stabilizer/dp/B07332SM8W (Year: 2017).*
(Continued)

*Primary Examiner* — Terrell L McKinnon
*Assistant Examiner* — Ding Y Tan
(74) *Attorney, Agent, or Firm* — Holtz, Holtz & Volek PC

(57) ABSTRACT

Provided is a stand for a device that is capable of suppressing interference between a plurality of arms that are rotatably coupled and a device attached to an arm. The stand for a device includes a supporter that includes a first fulcrum; a first arm that is coupled to the supporter so as to be rotatable around the first fulcrum, and that includes a second fulcrum on one end; a second arm that includes a first end and a second end, the first end being coupled to the first arm so as to be rotatable around the second fulcrum; a grip; and a joint that is coupled to the second end of the second arm and the grip, is couplable to a device, and for which an orientation of the device with respect to the second arm is changeable by an operation of the grip.

14 Claims, 11 Drawing Sheets

(58) Field of Classification Search
CPC ... F16M 11/2078; F16M 11/42; G03B 17/561
See application file for complete search history.

(56) References Cited

U.S. PATENT DOCUMENTS

| | | | | |
|---|---|---|---|---|
| 5,374,059 | A | * 12/1994 | Huang | A63B 60/10 |
| | | | | 473/550 |
| 5,876,005 | A | 3/1999 | Vasconi | |
| 6,430,038 | B1 | 8/2002 | Helot et al. | |
| 7,515,952 | B2 | * 4/2009 | Balas | A61B 5/0075 |
| | | | | 359/368 |
| 7,934,689 | B2 | 5/2011 | Chiu et al. | |
| 8,035,957 | B2 | * 10/2011 | Jung | F16M 11/105 |
| | | | | 361/679.06 |
| 8,540,438 | B1 | 9/2013 | Cronin et al. | |
| 8,733,722 | B2 | * 5/2014 | Hung | F16M 13/02 |
| | | | | 248/584 |
| 9,266,243 | B2 | 2/2016 | Swartz et al. | |
| 10,506,995 | B2 | 12/2019 | Ninomiya et al. | |
| 2003/0218106 | A1 | 11/2003 | Pensel | |
| 2003/0230698 | A1 | * 12/2003 | Strauss | A61B 90/25 |
| | | | | 606/1 |
| 2007/0001070 | A1 | 1/2007 | Ericson | |
| 2007/0050139 | A1 | * 3/2007 | Sidman | F16M 11/18 |
| | | | | 318/649 |
| 2008/0132786 | A1 | 6/2008 | Asai et al. | |
| 2012/0182709 | A1 | * 7/2012 | Asai | A61B 8/4405 |
| | | | | 361/810 |
| 2013/0286623 | A1 | * 10/2013 | Slipy | H04M 1/0202 |
| | | | | 361/807 |
| 2014/0016029 | A1 | 1/2014 | Huang | |
| 2014/0192504 | A1 | 7/2014 | Richard et al. | |
| 2014/0226281 | A1 | 8/2014 | Emami | |
| 2015/0150440 | A1 | * 6/2015 | Salvati | A61B 1/32 |
| | | | | 600/109 |
| 2015/0285429 | A1 | 10/2015 | Le | |
| 2015/0366336 | A1 | * 12/2015 | Wong | F16M 11/38 |
| | | | | 248/371 |
| 2015/0369418 | A1 | * 12/2015 | Wong | F16M 13/00 |
| | | | | 248/309.3 |
| 2018/0296082 | A1 | * 10/2018 | Salvati | A61B 1/0005 |
| 2018/0320869 | A1 | * 11/2018 | Yu | F21L 14/02 |
| 2019/0086022 | A1 | 3/2019 | Anderson et al. | |
| 2020/0326060 | A1 | 10/2020 | Fitch | |

FOREIGN PATENT DOCUMENTS

| | | | | |
|---|---|---|---|---|
| GB | 2448421 | A | * 10/2008 | ......... A61B 1/00149 |
| JP | 3002484 | U | * 7/1994 | |
| JP | 3002484 | U | 9/1994 | |
| JP | H0843934 | A | 2/1996 | |
| JP | 2003322905 | A | 11/2003 | |
| JP | 2004341189 | A | 12/2004 | |
| JP | 2009069380 | A | 4/2009 | |
| JP | 2014235242 | A | 12/2014 | |
| JP | 2016165045 | A | 9/2016 | |
| JP | 2016178993 | A | 10/2016 | |
| JP | 2017037519 | A | 2/2017 | |
| JP | 2017125609 | A | 7/2017 | |

OTHER PUBLICATIONS

Tilta ring grip for gimbal sold on amazon dated Feb. 6, 2021, https://www.amazon.com/Tilta-Advanced-Ring-Grip-RS/dp/B08PHX8CVS (Year: 2021).*
Wallach continuous zoom colposcope from Cooper Surgical Inc. product sell sheet dated Apr. 2018, https://www.coopersurgical.com/detail/wallach-zoomscope-with-trulight/ and https://www.coopersurgical.com/detail/wallach-zoomstar-with-trulight/ (Year: 2018).*
Cheesycam DIY pvc gimbal stand ring frame article dated Nov. 13, 2016, https://ftp.cheesycam.com/diy-pvc-gimbal-fig-ring-ring-stand/ (Year: 2016).*
Bovie Medical Colpo-master colposcope product sheet, https://shop.symmetrysurgical.com/en/product/portfolios-colposcopes/CS-103.105 (Year: 2019).*
Sonologic ID HD video colposcope product sheet, archive.org dated: Sep. 25, 2020 https://www.sonologic.com.au/product-category/colposcopes/?gad_source=1&gclid=EAlalQobChMI_df5u7bJhAMVQU9HAR3AqAx0EAAYASAAEgKOT_D_BWE (Year: 2020).*
U.S. Appl. No. 17/885,403; First Named Inventor: Junji Mukai; Title: "Stand for Device"; filed Aug. 10, 2022.
Distribution of leaflets, Apr. 22 and 23, 2021.
Exception to Lack of Novelty of Invention (and English translation thereof) dated Sep. 29, 2021 filed in the Japanese Patent Office in Japanese Application No. 2021-139592 (which is a counterpart of related U.S. Appl. No. 17/885,403).
Exception to Lack of Novelty of Invention (and English translation thereof) dated Sep. 29, 2021 filed in the Japanese Patent Office in counterpart Japanese Application No. 2021-139594.
The 73rd Annual Congress of the Japan Society of Obstetrics and Gynecology, Apr. 22 and 23, 2021.
U.S. Appl. No. 17/711,599; First Named Inventor: Jumpei Ishibashi; Title: "Support Apparatus for Electronic Device, and Electronic Device"; filed Apr. 1, 2022.
Office Action (Non-Final Rejection) dated Mar. 23, 2022, issued in related U.S. Appl. No. 17/711,599.
Office Action (Non-Final Rejection) dated Mar. 23, 2023, issued in related U.S. Appl. No. 17/711,599.
Office Action (Non-Final Rejection) dated Jul. 12, 2023, issued in related U.S. Appl. No. 17/885,403.
Japanese Office Action (and an English translation thereof) dated Jul. 4, 2023, issued in counterpart Japanese Application No. 2021-139594.
Japanese Office Action dated Apr. 25, 2023 (and English translation thereof) issued in related JP Application No. 2021-139592.
Japanese Office Action dated Apr. 25, 2023 (and English translation thereof) issued in counterpart JP Application No. 2021-139594.
Office Action (Final Rejection) dated Oct. 24, 2023, issued in related U.S. Appl. No. 17/885,403.
Japanese Dismissal of Amendments and Decision of Rejection (and an English translation thereof) dated Nov. 7, 2023, issued in counterpart Japanese Application No. 2021-139594.

* cited by examiner

STAND FOR DEVICE

CROSS-REFERENCE TO RELATED APPLICATION

This application claims the benefit of Japanese Patent Application No. 2021-139594, filed on Aug. 30, 2021, the entire disclosure of which is incorporated by reference herein.

FIELD

The present disclosure relates generally to a stand for a device.

BACKGROUND

Stands for supporting cameras as devices are known in the related art. An example of such a stand is disclosed in Unexamined Japanese Patent Application No. 2017-37519. With the stand described in Patent Literature 1, the camera is held in a state in which the optical axis of the lens is perpendicular to a floor surface in order to image the floor surface of a building.

SUMMARY

A stand for a device according to the present disclosure includes a supporter that includes a first fulcrum; a first arm that is coupled to the supporter so as to be rotatable around the first fulcrum, and that includes a second fulcrum on one end; a second arm that includes a first end and a second end, the first end being coupled to the first arm so as to be rotatable around the second fulcrum; a grip; and a joint that is coupled to the second end of the second arm and the grip, is couplable to a device, and for which an orientation of the device with respect to the second arm is changeable by an operation of the grip, wherein in a case where the second arm is in a state rotated toward a side of the first arm, the grip can be positioned at a first position at which the device does not interfere with the first arm and the grip does interfere with the first arm, and a second position at which both the device and the grip do not interfere with the first arm.

BRIEF DESCRIPTION OF THE DRAWINGS

A more complete understanding of this application can be obtained in a case where the following detailed description is considered in conjunction with the following drawings, in which.

DETAILED DESCRIPTION

Figure 1:
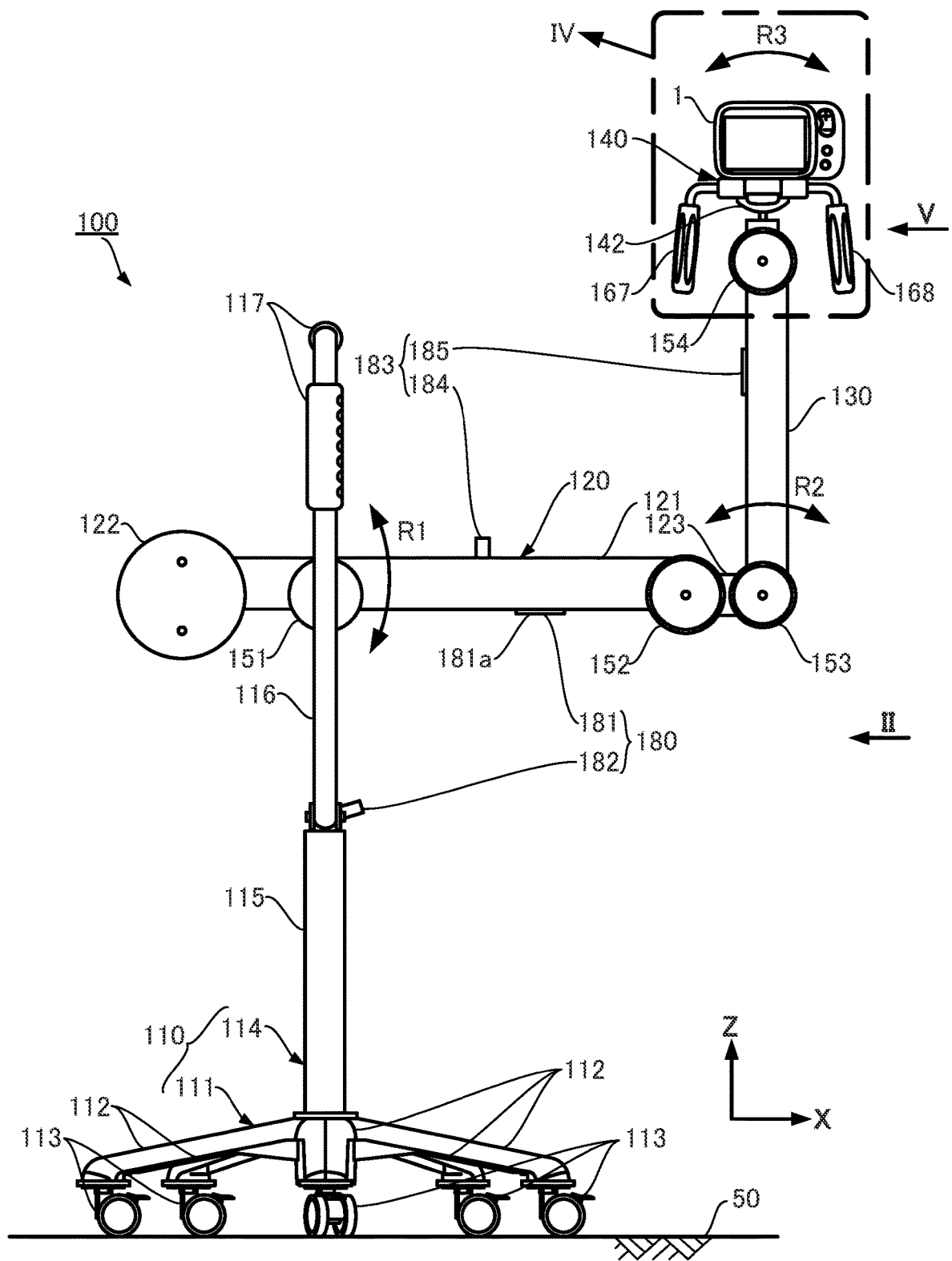
FIG. 1 is an overview drawing illustrating a situation in which a camera is attached to a camera stand according to an embodiment of the present disclosure, and is performing imaging.

Hereinafter, a stand for a device according to embodiments of the present disclosure is described in while referencing the drawings. Note that, in the present embodiment, as illustrated in FIG. 1, a stand (hereinafter referred to as "camera stand 100") for a camera 1 as the device is described. Here, the camera stand 100 supports the camera 1.

As illustrated in FIG. 1, the camera stand 100 includes a supporter 110 placed on a floor 50 of a building for example, a first arm 120 rotatably attached to the supporter 110, a second arm 130 rotatably attached to one end of the first arm 120, and an attachment stand 140 rotatably attached to one end of the second arm 130. The supporter 110 may be placed on the ground, a corridor, a table, or a chair. Note that, as illustrated in FIG. 1, the camera 1 is attached to the attachment stand 140 and, as a result, imaging can be carried out while suppressing shaking during imaging. In one example, the camera 1 is implemented as a digital camera that images a subject. Note that, in the description of the camera stand 100, a right-hand coordinate system is appropriately referenced in which, as illustrated in FIG. 1, the direction in which the horizontally disposed first arm 120 extends is defined as the +X-axis direction, the vertical direction is defined as the Z-axis direction, upward in the Z-axis direction is defined as the +Z-axis direction, and the Y-axis direction is defined as being orthogonal to the X-axis direction and the Z-axis direction.

The supporter 110 includes a base 111 and an upright portion 114. The base 111 includes, for example, five extending portions 112 extending radially at equal angle spacings from the center of the base 111, and a caster 113 attached to each of the five extending portions 112. The upright portion 114 rises in the +Z-axis direction from the center of the base 111.

The casters 113 are respectively provided on the tips of the five extending portions 112, and are disposed spaced apart from each other. Due to this configuration, the camera stand 100 can be stably moved on the floor 50 by the five casters 113. A stopper that stops the movement of the wheel is provided on at least a portion of the casters 113.

Figure 2:
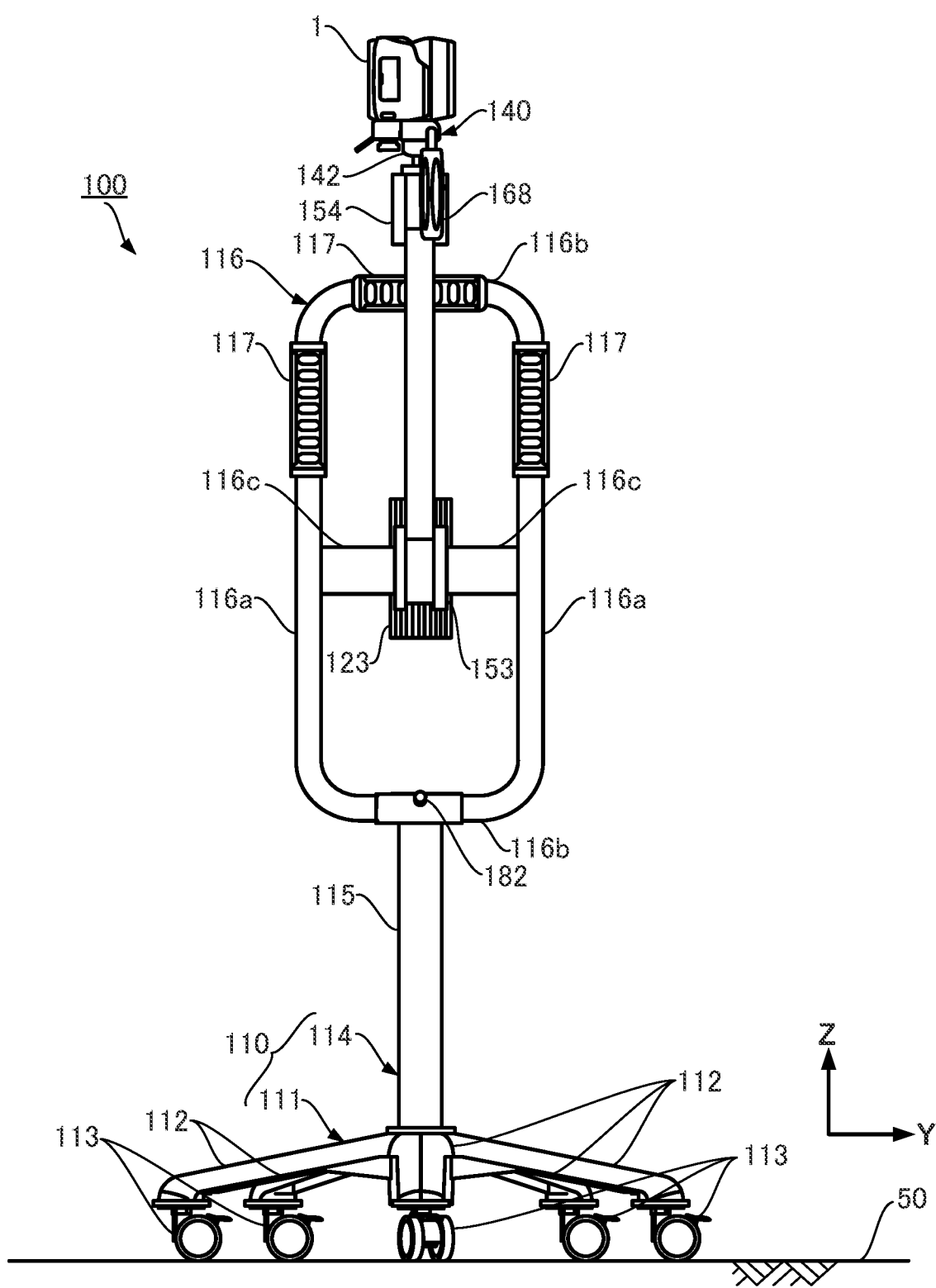
FIG. 2 is an overview drawing of the camera stand, viewed from arrow II in FIG. 1.

As illustrated in FIG. 2, the upright portion 114 includes a support pillar 115 rising from the center of the base 111, and a frame member 116 connected to an upper end of the support pillar 115.

The frame member 116 includes a frame that is formed in a rectangular shape from a metal pipe. Each corner of the frame is formed in a curved shape. The frame member 116 includes a pair of long sides 116a, 116a that extend in the Z-axis direction and are arranged parallel to the Y-axis direction, and a pair of short sides 116b, 116b that extend in the Y-axis direction and are arranged parallel to the Z-axis direction. Additionally, two projections 116c that extend inward horizontally from an inner edge are formed at positions of the same height on each long side 116a of the pair of long sides 116a, 116a. A first fulcrum 151 (FIG. 1) that rotatably supports an intermediate section of the first arm 120 is provided on the two projections 116c. Additionally, the upper end of the support pillar 115 is connected to a center portion of the short side 116b provided on the −Z-axis direction side of the pair of short sides 116b, 116b. Due to this configuration, the frame member 116 is supported above the support pillar 115 that is provided upright in the vertical direction. Additionally, a grip 117 is wound on the short side 116b on the upper side and portions of the pair of long sides 116a, 116a above the projections 116c. In one example, the grip 117 is made from rubber, and includes a plurality of grooves on the surface so as to facilitate gripping in a case of operating the camera stand.

The first arm 120 includes an arm main body 121 that is rotatably supported around the first fulcrum 151 by the supporter 110, an auxiliary arm 123 on one end of the arm main body 121, the auxiliary arm 123 having another end that is rotatably supported around a fourth fulcrum 152, and a counterweight 122 that is provided on another end of the arm main body 121.

The arm main body 121 is disposed in a state passing through the interior of the frame member 116. The arm main body 121 is rotatably supported by the first fulcrum 151 provided on the projections 116c (FIG. 2), at a position closer to the other end, on which the counterweight 122 is provided, than to the exact center in the longitudinal direction of the arm main body 121. Due to this configuration, the arm main body 121 is rotatable in a direction indicated by arrow R1, that is, in a circumferential direction around an imaginary axis extending in the Y-axis direction from the first fulcrum 151. As illustrated in FIG. 1, the arm main body 121 is rotatable, from a state in which the arm main body 121 is extended horizontally, clockwise (in the drawing) to a hereinafter described stored position at which a magnet member 181 and a magnet receiver 182 contact, and counterclockwise (in the drawing) by a first predetermined angle (for example, 28°). Further counterclockwise rotation is restricted by a non-illustrated rotation restricting mechanism. In one example, the rotation restricting mechanism includes a slit in which the arm main body 121 is inserted, and the rotation of the arm main body 121 is restricted by this slit contacting the rotating arm main body 121.

In one example, the counterweight 122 is formed by stacking a plurality of disks made from stainless steel. The counterweight 122 is disposed on the −X-axis direction side of the first fulcrum 151. The counterweight 122 has a weight corresponding to the weights of the camera 1, the second arm 130, and the like disposed on the +X-axis direction side of the first fulcrum 151, and to a moment acting on the first arm 120 due to the weight of the first arm 120 itself.

As described later, the auxiliary arm 123 functions so as to dispose the first arm 120 and the second arm 130, that are at the stored positions, substantially parallel to each other, with a spacing between the first arm 120 and the second arm 130. Thus, the auxiliary arm 123 is an auxiliary member included in the first arm 120.

The second arm 130 is rotatably supported by one end of the auxiliary arm 123 at another end (first end) of the second arm 130. The second arm 130 is shorter than the first arm 120. The second arm 130 is rotatably supported by the second fulcrum 153 in a direction indicated by arrow R2, that is, in a circumferential direction around an imaginary axis extending in the Y-axis direction from the second fulcrum 153. As illustrated in FIG. 1, the second arm 130 is rotatable, from a state extended upward, clockwise (in the drawing) by a second predetermined angle (for example 25°), and counterclockwise (in the drawing) by a third predetermined angle (for example 25°). Further rotation is restricted by a non-illustrated rotation restricting mechanism.

Thus, the first arm 120 and the second arm 130 are disposed on the XZ plane in FIG. 1 that extends in the vertical direction. Additionally, the first arm 120 and the second arm 130 respectively rotate around an imaginary axis extending in the Y-axis direction orthogonal to the XZ plane and, as such, are mutually positioned on the XZ plane in FIG. 1, which is substantially the same plane, even after rotation.

Figure 5:
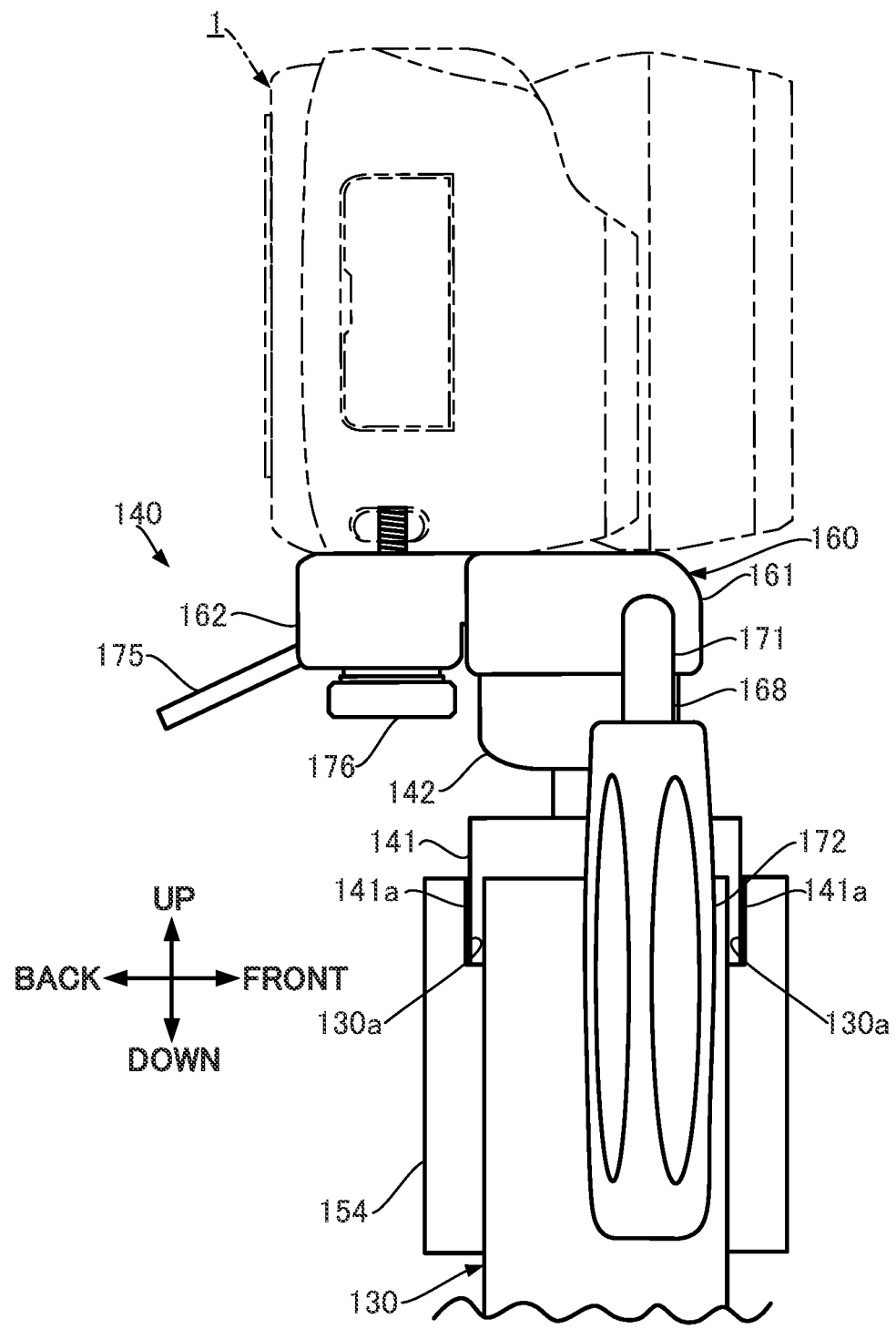
FIG. 5 is a drawing focused on the tip of the camera stand illustrated in FIG. 1, and is drawing viewed from arrow V in FIG. 1.

The attachment stand 140 is attached, to one end (second end) of the second arm 130, so as to be rotatable around a third fulcrum 154, and is rotatable in a direction indicated by arrow R3 in FIG. 1, that is, in a circumferential direction around an imaginary axis extending in the Y-axis direction from the third fulcrum 154. As illustrated in FIG. 5, the attachment stand 140 includes a coupler 141 that is rotatably attached to the third fulcrum 154, a ball joint 142, as a joint, that is screwed to the coupler 141, and an attacher 160 attached to the ball joint 142.

The coupler 141 includes an insert 141a that is inserted into two slits 130a formed in the end of the second arm 130, and this insert 141a is rotatably coupled to the second arm 130. The two slits 130a are formed in arcs that correspond to the shape of the end of the second arm 130. In a case where the attachment stand 140 rotates around the third fulcrum 154, the coupler 141 eventually contacts the edge of the slits 130a, and further rotation of the attachment stand 140 is restricted. Thus, the slits 130a formed in the second arm 130 restrict the amount of rotation around the third fulcrum 154 of the attachment stand 140.

Figure 6:
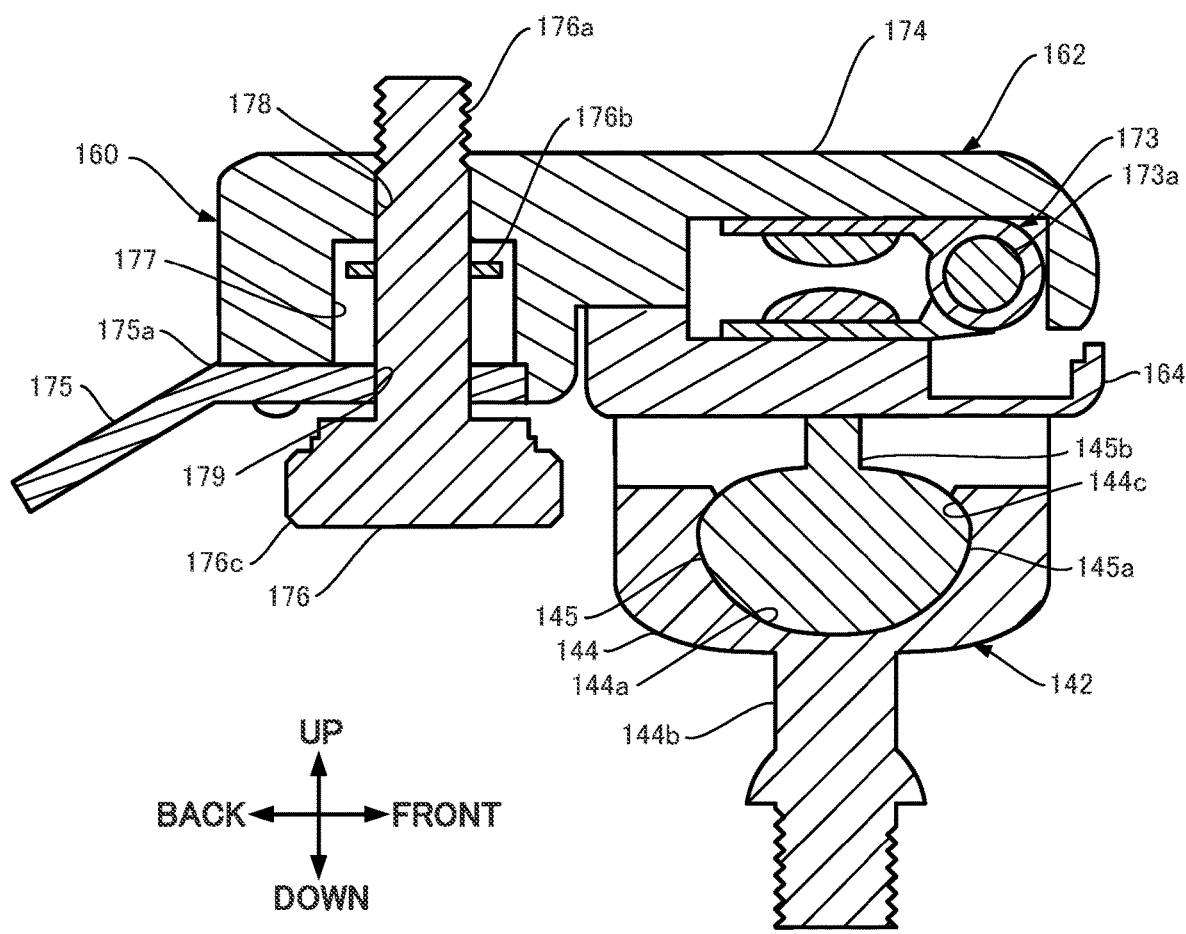
FIG. 6 is a cross-sectional view of the camera stand, taken along line VI-VI in FIG. 4.

As illustrated in FIG. 6, the ball joint 142 includes a ball cradle 144, and a ball member 145 fitted into the ball cradle 144.

A recess 144a that is open upward is formed in the ball cradle 144. The recess 144a has a shape into which a ball member main body 145a, which is spherical, fits. A curved-back portion 144c where an inner wall of the recess 144a is curved back is formed in the ball cradle 144, and this curved-back portion 144c contacts the ball member main body 145a from above to prevent the ball member main body 145a from falling out of the recess 144a. The size of the recess 144a changes by tightening and loosening a knob screw 148 illustrated in FIG. 4 that is provided on a side surface of the ball joint 142. Due to this configuration, the ball member 145 can be arranged in a fixed state in the recess 144a and in a movable state in the recess 144a. Additionally, a male screw 144b protruding downward is formed on a lower surface of the ball cradle 144. The male screw 144b is screwed into a screw hole (not illustrated in the drawings) of the coupler 141 illustrated in FIGS. 4 and 5. Thus, the ball joint 142 is connected to the second arm 130.

As illustrated in FIG. 6, the ball member 145 includes the spherical ball member main body 145a and a support pillar 145b projecting from the ball member main body 145a. The support pillar 145b is fixed to a lower surface of the attacher 160. As such, in response to the ball member 145 moving within the recess 144a, the attacher 160 moves in accordance with the movement of the support pillar 145b. For example, as illustrated in FIG. 6, the support pillar 145b that is in the state extended upward can be tilted in all directions from the upward extended attitude due to the ball member 145 being operated and, also, can be rotated 360° with the direction the support pillar 145b extends as an axis.

Figure 3A:
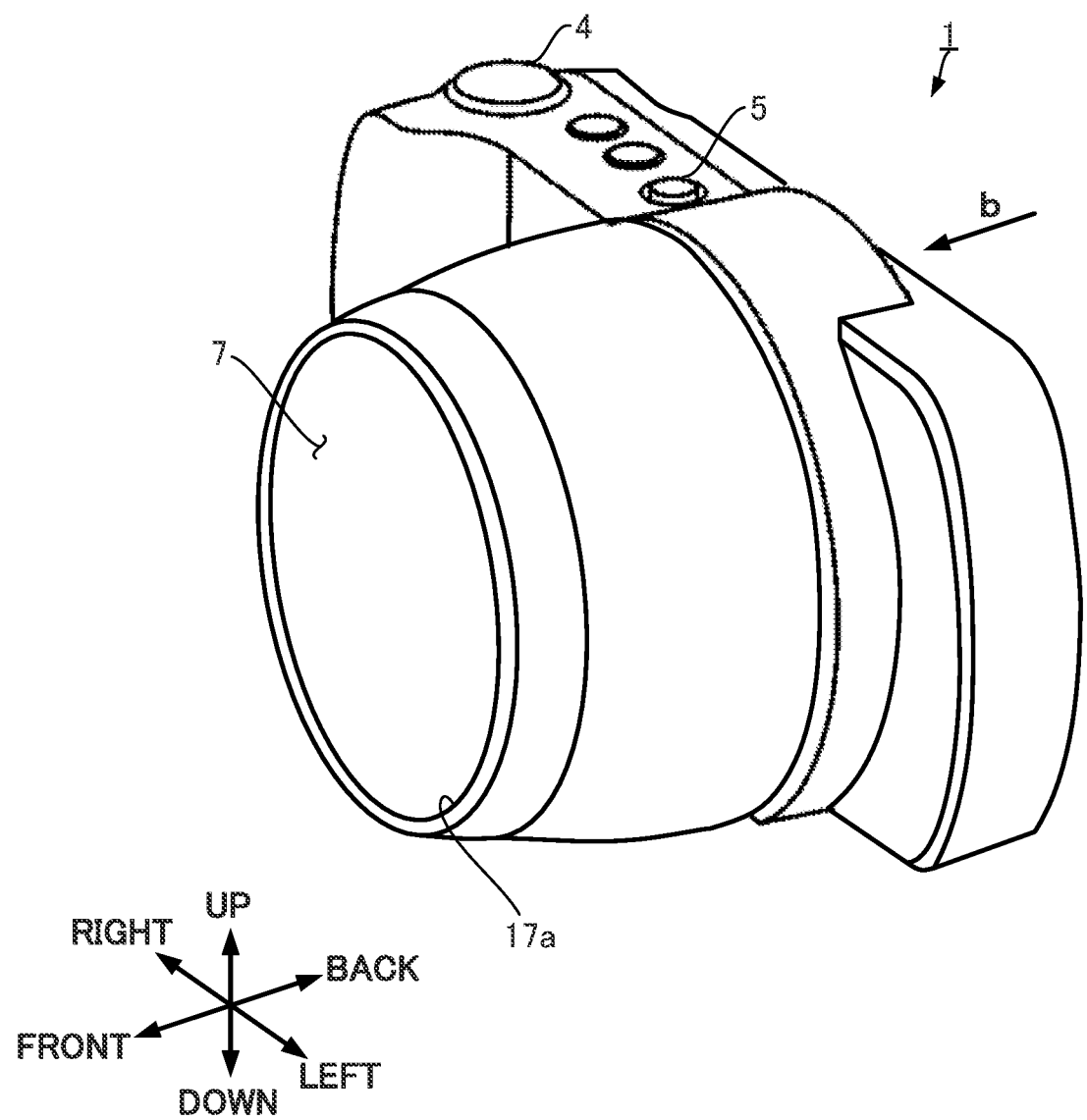
FIG. 3A is a perspective view illustrating the camera illustrated in FIG. 1.
Figure 3B:
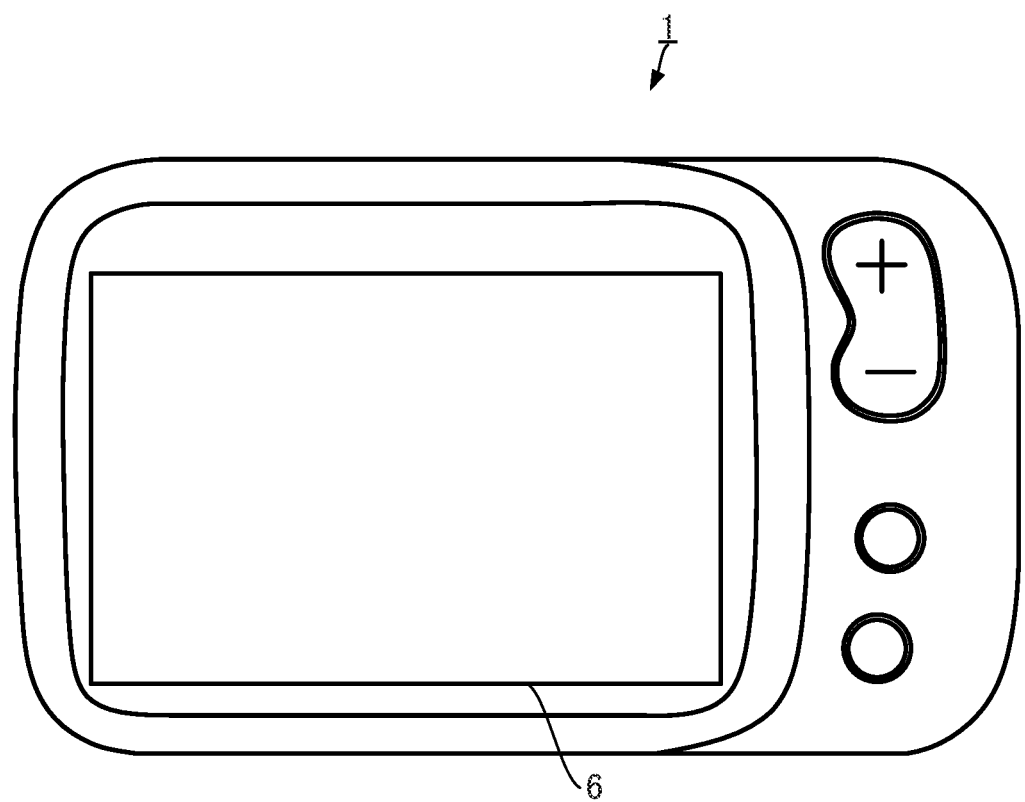
FIG. 3B is a back view of the camera, viewed from arrow b in FIG. 3A.
Figure 3B:
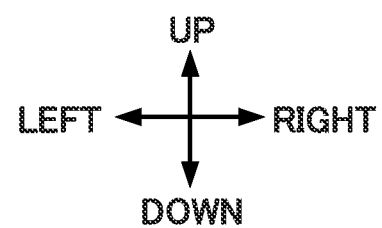
Figure 4:
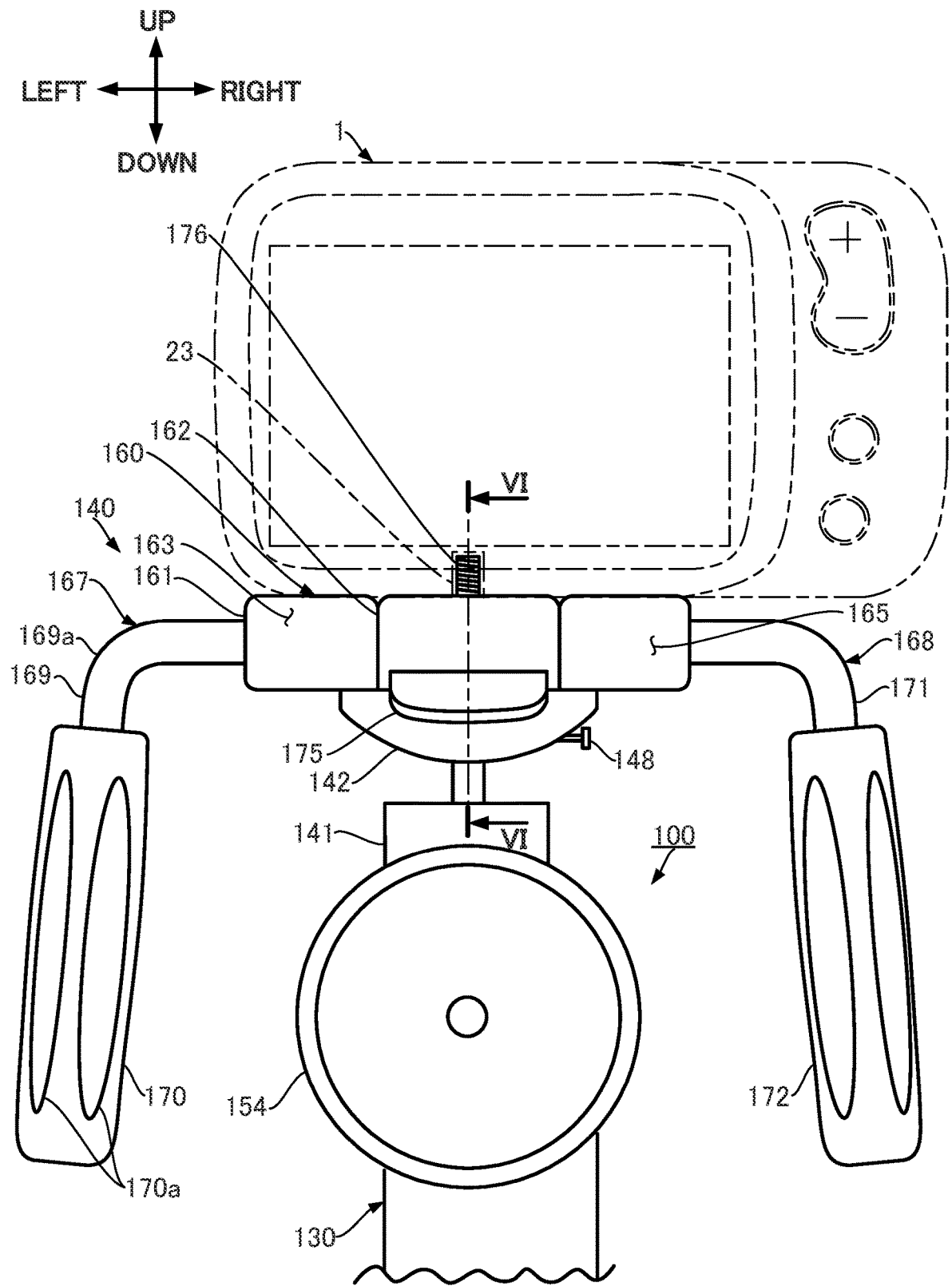
FIG. 4 is a drawing focused on a tip of the camera stand illustrated in FIG. 1, and is an enlarged view of section IV in FIG. 1.

As illustrated in FIG. 4, the attacher 160 includes a base portion 161 coupled to the ball joint 142, and a rotating portion 162 rotatably attached to the base portion 161. Note that the camera 1 is attached to the attacher 160 in a case where the rotating portion 162 is in a first rotation state (hereinafter referred to as an "unrotated state") in which the rotating portion 162 is not rotated with respect to the base portion 161, as illustrated in FIG. 4. At this time, the camera 1 is attached such that the right direction of the camera 1 matches the direction in which a right grip 168 is disposed and such that the left direction of the camera 1 matches the direction in which a left grip 167 is disposed. As illustrated in FIGS. 3A and 3B, in front of the camera 1 is defined as a direction in which a cover plate 7, which allows reflected light from an imaging subject to enter into the camera 1, is provided, and a direction opposite the front is defined as behind the camera. The up, down, left, and right directions, in a case of viewing the camera 1 from behind, the camera 1 being disposed such that a shutter button 4 faces upward, are defined as-is as the up, down, left, and right directions of the camera 1. In the description of the details of the attacher 160, the terms "front-back direction", "up-down direction", and "left-right direction" of the camera 1 in a case of attaching to the attacher 160 are appropriately used.

As illustrated in FIG. 4, the base portion 161 includes a rectangular parallelepiped left block 163 disposed on the left side, a rectangular parallelepiped right block 165 disposed on the right side, and a rotation supporter 164 illustrated in FIG. 6 that is sandwiched between the left block 163 and the right block 165, and is formed integrally with the left and right blocks 163 and 165.

A height of the rotation supporter 164 is lower than heights of the left block 163 and the right block 165. As illustrated in FIG. 6, the rotating portion 162 is attached, via a hinge 173 as a rotating component, to the rotation supporter 164 that has the lower height and, due to this configuration, the rotating portion 162 is rotatably supported by the base portion 161. As illustrated in FIG. 4, in a case where the rotating portion 162 is in the unrotated state, upper surfaces of the left block 163, the rotating portion 162, and the right block 165 are flush, and the respective flush surfaces function as an installation surface for installing the camera 1.

As illustrated in FIG. 4, the left grip 167 is provided on a left side surface of the base portion 161, and the right grip 168 is provided on a right side surface of the base portion 161. The left grip 167 includes an extending section 169 that projects leftward from the left side surface of the base portion 161 and bends at a bend 169a to extend diagonally downward, and a grip 170 provided on an end of the extending section 169. The extending section 169 is made from a metal and, in one example, is formed from stainless steel rod material. In one example, the grip 170 is made from rubber, and a plurality of grooves 170a are formed on the grip 170 so as to facilitate gripping. Note that the right grip 168 has a left-right symmetrical configuration with the left grip 167, and includes an extending section 171 similar to the extending section 169 and a grip 172 similar to the grip 170. The grip 170 and the grip 172 have a spreading arrangement in which spacing between the grips 170 and 172 widens with progression downward. Note that the grips 170 and 172 that are made from rubber have, as described later, functions of cushioning materials that soften impacts due to contact of the left and right grips 167 and 168 with the first arm 120 that may possibly occur in a case of storing the first arm 120 and the second arm 130.

As illustrated in FIG. 6, the rotating portion 162 rotates around a core rod 173a of the hinge 173, that is, around an imaginary axis extending in the left-right direction from the core rod 173a. The rotating portion 162 includes a rotating portion main body 174, a handle 175 attached to the rotating portion main body 174, and an attachment screw 176 for attaching the camera 1 illustrated in FIG. 4 to the rotating portion 162.

A width in the left-right direction of the rotating portion main body 174 less than or equal to a width in the left-right direction of the rotation supporter 164. Meanwhile, as illustrated in FIG. 6, a length in the front-back direction of the rotating portion main body 174 is longer than a length in the front-back direction of the rotation supporter 164, and a portion of the rotating portion main body 174 in the unrotated state projects backward from the rotation supporter 164. A large diameter first insertion hole 177 and a small diameter second insertion hole 178 are formed concentrically and continuously, from bottom to top in this protruding portion.

In one example, the handle 175 is formed by bending a flat plate made from a metal, and has a bend 175a that is bent at an obtuse angle. The side of the handle 175 on the front side of the bend 175a is positioned below the rotating portion main body 174, and is screwed into a lower surface of the rotating portion main body 174. Additionally, an insertion hole 179 centered on the first insertion hole 177 is formed in the handle 175. Meanwhile, the side of the handle 175 on the back side of the bend 175a extends diagonally downward from the lower surface of the rotating portion main body 174. This portion of the handle 175 that extends diagonally downward is a portion where a user places a hand to raise and rotate the rotating portion 162.

The attachment screw 176 includes a male screw 176a that is formed on a tip of the attachment screw 176, and a ring-shaped stopper 176b formed on a shaft of the attachment screw 176. The attachment screw 176 is inserted from below into the insertion hole 179, the first insertion hole 177, and the second insertion hole 178 in this order, and the stopper 176b is accommodated in the first insertion hole 177. The stopper 176b cannot pass through the second insertion hole 178 formed in the rotating portion 162 and the insertion hole 179 formed in the handle 175. The attachment screw 176 is prevented from falling out due to the stopper 176b being unable to pass through the insertion hole 179. Additionally, the male screw 176a formed on the tip of the attachment screw 176 mates with a screw hole 23 formed in a bottom surface of the camera 1 illustrated in FIG. 4. Due to this configuration, an appropriate axial force can be introduced to the shaft of the attachment screw 176 between the male screw 176a and a head 176c, and the camera 1 can be attached to the rotating portion 162 without rattling the camera 1.

Figure 8:
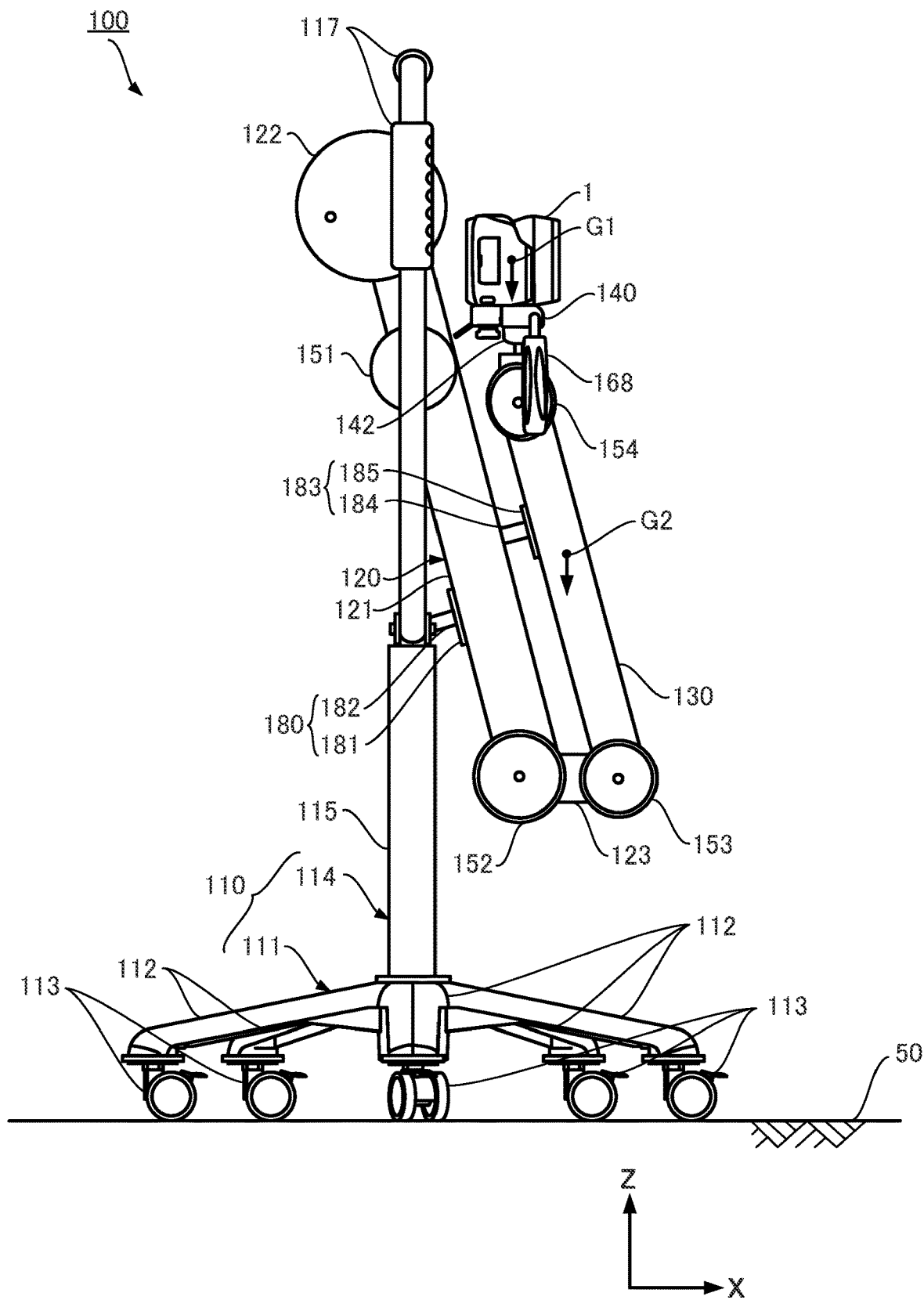
FIG. 8 is an overview drawing illustrating a state in which the first arm and the second arm of the camera stand illustrated in FIG. 1 are stored.

The camera stand 100 includes a first locking device 180 and a second locking device 183 for maintaining the state in which the first arm 120 and the second arm 130 are at the stored positions such as illustrated in FIG. 8 (that is, in a state in which all of the arms, including the first arm 120 and the second arm 130, are folded).

Figure 7:
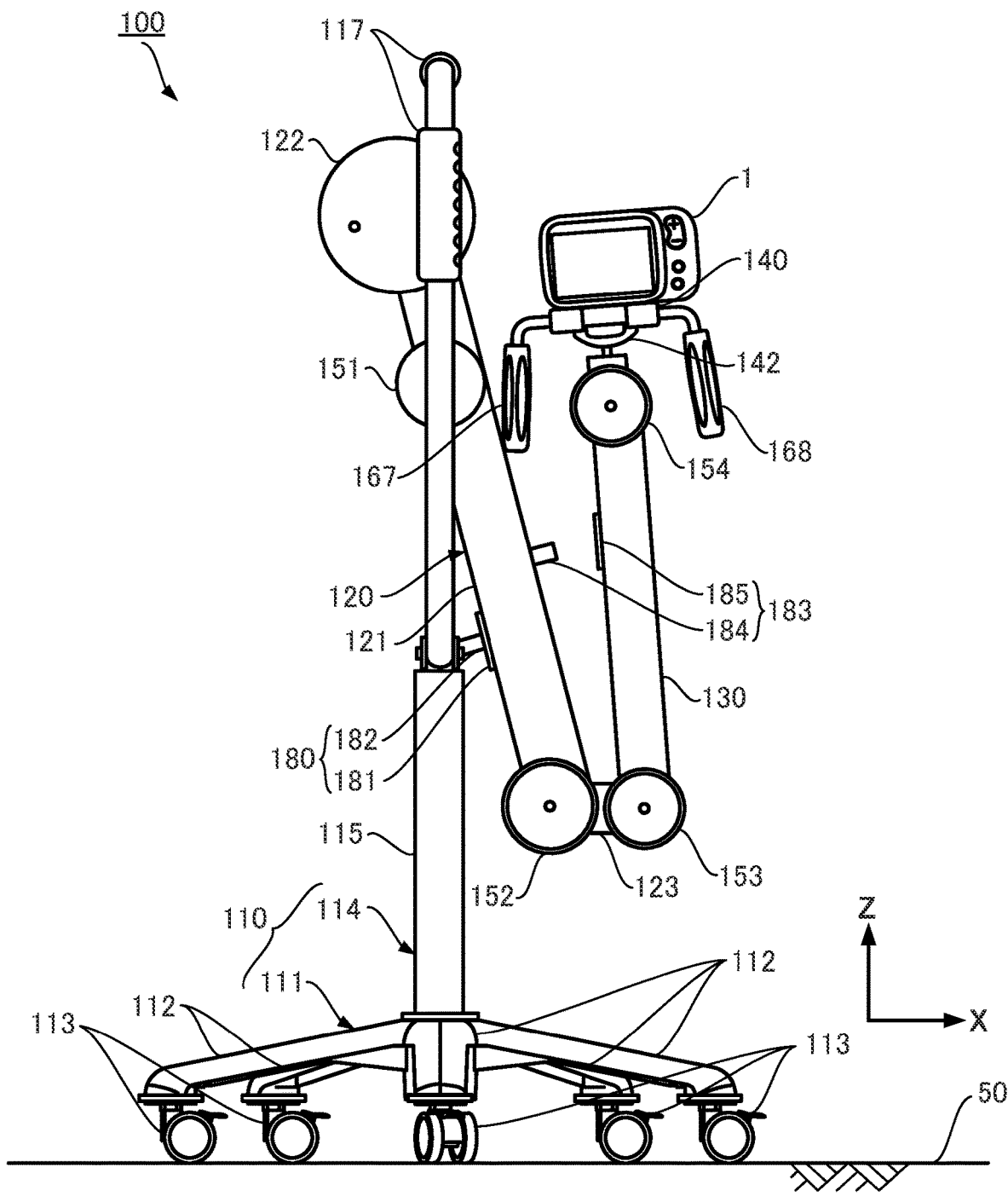
FIG. 7 is an overview drawing illustrating a process of storing a first arm and a second arm of the camera stand illustrated in FIG. 1.

As illustrated in FIG. 1, the first locking device 180 includes a magnet member 181 as a first magnetic body, and a magnet receiver 182 as a first magnetic body receiver. The magnet member 181 is provided on an outer circumferential surface of the first arm 120, and the magnet receiver 182 is provided on the upright portion 114. In one example, the magnet member 181 is a combination of a piece of metal known as a yoke and a magnet, includes an adsorption surface 181a, and is provided such that the adsorption surface 181a faces outward. In one example, the magnet receiver 182 is a ferromagnetic metal such as, for example, iron, and is provided at the center of the short side 116b provided on the −Z-axis direction side. The magnet receiver 182 is a columnar protrusion, and is provided so as to face diagonally upward with respect to the +X-axis direction. In a case where the first arm 120 is rotated counterclockwise (in the drawing) from the state illustrated in FIG. 1, the magnet receiver 182 and the magnet member 181 eventually contact and are adsorbed to each other, as illustrated in FIG. 7. At this time, the magnet receiver 182 contacts the adsorption surface 181a of the magnet member 181 substantially perpendicularly. As a result, the upright portion 114 and the first arm 120 are locked to each other by the first locking device 180.

As illustrated in FIG. 1, the second locking device 183 includes a magnet receiver 184 as a second magnetic body receiver, and a magnet member 185 as a second magnetic body. The magnet receiver 184 projects from the outer circumferential surface of the first arm 120, and the magnet member 185 is provided on an outer circumferential surface of the second arm 130. As with the magnet receiver 182, in one example, the magnet receiver 184 is a column made from iron, and projects perpendicularly from the outer circumferential surface of the first arm 120. As with the magnet member 181, in one example, the magnet member 185 is formed by combining a piece of metal and a magnet. In a case where the second arm 130 is rotated counterclockwise (in the drawing) from the state illustrated in FIG. 1, the magnet receiver 184 and the magnet member 185 eventually contact and are adsorbed to each other, as illustrated in FIG. 8. At this time, the magnet receiver 184 contacts the magnet member 185 substantially perpendicularly. As a result, the first arm 120 and the second arm 130 are locked to each other by the second locking device 183.

Next, a method for imaging a subject using the camera 1 attached to the camera stand 100 is described. The camera 1 is attached to the camera stand 100 in order to suppress shaking during imaging. In a case where attaching the camera 1 to the camera stand 100, as illustrated in FIG. 4, the right direction of the camera 1 is faced in the direction in which the right grip 168 is disposed, and the left direction of the camera 1 is faced in the direction in which the left grip 167 is disposed. Then, the attachment screw 176 projecting from the attacher 160 is screwed into the screw hole 23 formed in the lower surface of the camera 1, thereby fixing the camera 1 to the attachment stand 140.

Then, the camera 1 is turned ON by pressing a power button 5 illustrated in FIG. 3A, and the user determines the composition of an image to be captured while viewing the imaging subject displayed on a liquid crystal monitor 6 (FIG. 3B) that functions as a finder. The user can, for example, move the casters 113 on the floor 50 to move the camera stand 100 to a desired location by holding, with hands, the grips 117 provided on the frame member 116 illustrated in FIGS. 1 and 2 and pushing/pulling.

Next, the user can rotate the first arm 120 around the first fulcrum 151, rotate the second arm 130 around the second fulcrum 153, and rotate the attachment stand 140 around the third fulcrum 154 by holding the left grip 167 and the right grip 168 illustrated in FIG. 1 with the hands and moving the hands. As a result, the camera 1 can be disposed at a desired position of the user within a movable range of the attachment stand 140. Here, the movable range is defined by the rotatable ranges of the first arm 120, the second arm 130, and the attachment stand 140. Furthermore, the user can face the camera 1 attached to the attacher 160 in a desired direction by loosening the knob screw 148 illustrated in FIG. 4 that is provided on the side surface of the ball joint 142 and holding the left grip 167 and the right grip 168 by the hands and moving the hands. The camera 1 connected to the ball joint 142 can be rotated with the direction in which the support pillar 145b illustrated in FIG. 6 extends (the up direction in FIG. 6) as a center axis and, also, can be tilted in any direction with respect to the direction in which the support pillar 145b extends. Then, the user tightens the knob screw 148 illustrated in FIG. 4 to fix the camera 1 together with the attacher 160 to the second arm 130, and determines the composition. As a result, during imaging, the camera 1 can be brought close to the subject due to the first arm 120 that projects in the horizontal direction and the second arm 130 that extends upward as illustrated in FIGS. 1 and 2 for example. Note that the operation order for determining the position and orientation of the camera 1 is not particularly limited, and the user can appropriately determine the operation order.

After the composition is determined in the manner described above, the user operates the shutter button 4 (FIG. 3A) to image the subject. The image captured in this manner is stored in a non-illustrated non-transitory recording medium accommodated inside the camera 1. In response to ending of the imaging of the imaging subject, the user presses the power button 5 (FIG. 3A) to turn the camera 1 OFF.

In a case where imaging by the camera 1 is completed and the camera stand 100 is in the state illustrated in FIG. 1, the hand-held left grip 167 and right grip 168 are moved so as to fold all of the arms including the first arm 120 and the second arm 130 projecting from the upright portion 114, and move the first arm 120 and the second arm 130 to the stored positions. Specifically, the first arm 120 is rotated clockwise (in FIG. 1) around the first fulcrum 151, and the second arm 130 is rotated counterclockwise (in FIG. 1) around the second fulcrum 153. As a result, amounts of projection of the first arm 120 and the second arm 130 from the upright portion 114 decrease. Eventually, as illustrated in FIG. 7, the magnet member 181 contacts the magnet receiver 182 due to the rotation of the first arm 120, thereby stopping further rotation of the first arm 120. As a result, the first arm 120 can be moved to the stored position. Thus, the stored position of the first arm 120 is a position at which the first arm 120 can be suppressed from projecting from the upright portion 114, is a position of the first arm 120 in a case where the camera stand 100 is in a compactly storable state (stored state) at a desired location, and is a position of the first arm 120 in a case where all of the arms, including the first arm 120 and the second arm 130, are in a folded state.

Meanwhile, depending on the attachment direction of the attachment stand 140, the right grip 168 or the left grip 167 may contact the first arm 120 via the rubber grip 170 or 172 before the magnet member 185 contacts the magnet receiver 184 due to the second arm 130 being rotated. In such a case, the knob screw 148 illustrated in FIG. 4 is loosened and the orientation of the attachment stand 140 is changed such that the right grip 168 or the left grip 167 does not contact the first arm 120. Alternatively, the attachment stand 140 can be rotated around the third fulcrum 154 to change the orientation of the attachment stand 140. After the orientation of the attachment stand 140 is changed in this manner such that the right grip 168 and the left grip 167 do not contact the first arm 120, the second arm 130 is rotated clockwise (in the drawing) further and, as a result, the magnet member 181 contacts the magnet receiver 182 as illustrated in FIG. 8, thereby stopping further rotation of the second arm 130. As a result, the second arm 130 can be moved to the stored position. Thus, the stored position of the second arm 130 is a position at which the second arm 130 can be suppressed from projecting from the upright portion 114, is a position of the second arm 130 in a case where the camera stand 100 is in a compactly storable state (stored state) at a desired location, and is a position of the second arm 130 in a case where all of the arms are in the folded state. Thus, the upright portion 114 and the first arm 120 are locked to each other by the first locking device 180, and the first arm 120 and the second arm 130 are locked to each other by the second locking device 183. As a result, as illustrated in FIG. 8, the state in which the first arm 120 and the second arm 130 are positioned at the stored positions is maintained while the camera 1 is attached and, as a result, the stored state of the camera stand 100 is maintained.

In a case where, as described above, the first arm 120 and the second arm 130 are at the stored positions and the camera stand 100 is in the stored state, the first arm 120 passes through the interior of the frame member 116 and is in a state in which the one end side on which the second fulcrum 153 is provided is extended diagonally downward. At this time, the second fulcrum 153 is positioned below the first fulcrum 151. Additionally, the auxiliary arm 123 is interposed between the second arm 130 and the arm main body 121, thereby providing distance between the first arm 120 and the second arm 130. As a result, the first arm 120 and the second arm 130 can be disposed substantially parallel to each other, and the one end side of the second arm 130 on which the third fulcrum 154 is provided can be extended diagonally upward.

According to the embodiment described above, the ball joint 142 is interposed between the one end of the second arm 130 and the attacher 160 to which the camera 1 is attached. As such, the attitudes of the camera 1 and the attacher 160 can be changed by operating the left grip 167 and the right grip 168 to operate the ball joint 142. As a result, the interference between the first arm 120 in the projecting state or the first arm 120 moved to the stored position, and the camera 1 or the attacher 160 can be suppressed. Specifically, in a case where the left grip 167 and the right grip 168 are at a first position as illustrated in FIG. 7, only the left grip 167 interferes with the first arm 120, and the camera 1 is not interfered with. The user can avoid interference not only between the first arm 120 and the camera 1, but also between the left grip 167 and the right grip 168 and the first arm 120 by operating the left grip 167 and the right grip 168 and moving the left grip 167 and the right grip 168 to a second position as illustrated in FIG. 8.

The ball joint 142 is rotatable around the third fulcrum 154 provided on the one end of the second arm 130. Due to this, the attitude of the camera 1 and the attacher 160 can be changed by rotating the ball joint 142 around the third fulcrum 154. As a result, interference between the first arm 120 and the camera 1 or the attacher 160 can be suppressed. These advantageous effects are demonstrated not only in a case where the first arm 120 is at the stored position, but also in a case where the first arm 120 is in a protruding state in a case where the camera stand 100 is being used.

Note that, by operating the left grip 167 and the right grip 168, an operation of the ball joint 142 for changing the facing direction of the camera 1 or the like and an operation of rotating the ball joint 143 around the third fulcrum 154 can be simultaneously executed, or only one of these operations can be executed. As a result, the left grip 167 and the right grip 168 can be moved to the first position (position where only the left grip 167, for example, interferes with the first arm 120, and the camera 1 is not interfered with) and the second position (position where not only interference between the first arm 120 and the camera 1 is avoided, but also interference between the left grip 167 and the right grip 168, and the first arm 120 is avoided).

The left grip 167 and the right grip 168 for gripping by the user can be extended from both sides of the attacher 160. The left grip 167 and the right grip 168 formed in this manner project from the camera and, in a case of moving the first arm 120 and the second arm 130 to the stored positions, interfere with the first arm 120 before the camera 1. As a result, the camera 1 can be prevented from directly contacting interfering objects such as the first arm 120 and the like.

The rubber grips 170 and 172 are provided on the left grip 167 and the right grip 168. In a case of storing the camera stand 100, the left grip 167 and the right grip 168 contact interfering objects such as the first arm 120, the second arm 130, and the like via the grips 170 and 172. As a result, the grips 170 and 172 can be made to function as cushioners that soften impacts, and can protect the camera 1 from impacts.

The present disclosure is not limited to the embodiment described above, and various modifications and uses are possible. In the embodiment described above, a description is given in which the camera 1 as the device is implemented as a digital camera, but configurations are possible in which the device is a typical digital camera that is commercially available, a medical digital camera that images an affected area of a person such as the skin or a mucous membrane, a video camera that mainly captures videos, or a camera attached to a smartphone or the like. Furthermore, provided that the device is supported by the stand, the device is not limited to a camera and, for example, may be an illumination device, a display, a personal computer, a telescope, a rangefinder for surveying, or any other suitable device. Moreover, the present disclosure can be applied to stands for supporting these devices.

A description is given in which the left grip 167 and the right grip 168 provided on the left and right of the attacher 160 have a spreading arrangement in which spacing between left grip 167 and the right grip 168 widens with progression downward. However, the arrangement of the left and right grips 167 and 168 is not limited thereto. For example, a configuration is possible in which the left grip 167 and the right grip 168 are arranged so as to cover the sides of the camera 1 by extending the left grip 167 and the right grip 168 upward from the left and right of the attacher. Due to this configuration, the camera 1 can be appropriately protected in a case where the camera 1 is performing imaging and in a case where the camera stand 100 is stored. Additionally, it is not necessary for grips to be provided on both sides of the attacher 160, and a configuration is possible in which only one grip of the left and right grips is provided on the attacher 160.

In a case where the camera stand 100 is in the stored state, whether the first arm 120 and the second arm 130 are disposed parallel to each other can be determined as desired. For example, a configuration is possible in which an arrangement is employed in which the second locking device 183 is made higher or the auxiliary arm 123 is shortened, and spacing between the second arm 130 and the first arm 120 increases toward the one end side of the second arm 130 to which the camera 1 is attached. Due to this configuration, the first arm 120 and the attachment stand 140 can be made less likely to interfere in a case where placing the camera stand 100 in the stored state.

The left grip 167 and the right grip 168 must have configurations whereby the facing direction of the camera 1 attached to the attacher 160 can be changed by operating the left grip 167 and the right grip 168, and may be directly or indirectly coupled to the ball joint 142 that is provided for that purpose. In the present embodiment, the left grip 167 and the right grip 168 are provided on the base portion 161 that is fixed to the support pillar 145b of the ball screw 142 and, as such, it can be said that the ball joint 142 is directly coupled to the left grip 167 and the right grip 168. However, it is possible to attach the left grip 167 and the right grip 168 to, for example, the rotating portion 162 and, in such a case, it can be said that the ball joint 142 is indirectly coupled to the left grip 167 and the right grip 168.

Figure 9A:
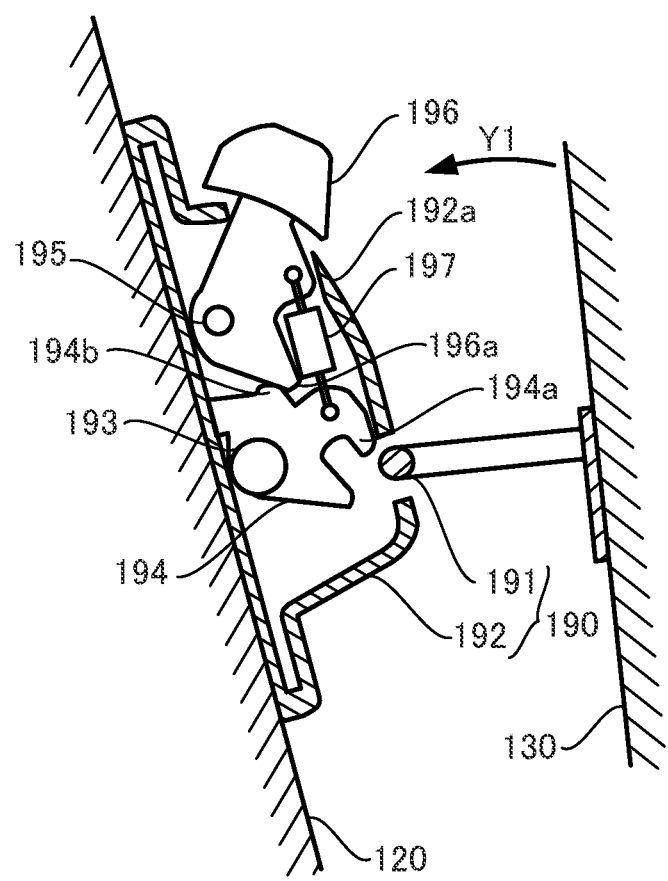
FIG. 9A is an overview drawing of a locking mechanism applicable to the camera stand illustrated in FIG. 1, and illustrates a case in which the locking mechanism is in a released state.

In the first locking device 180 and the second locking device 183 described above, adsorption by magnetic force is used to lock so that the first arm 120 and the second arm 130 do not move from the stored positions, but the present disclosure is not limited to a device that uses magnetic force as the stopping device. A configuration is possible in which, as another stopping device, a third stopping device 190 provided with a mechanical locking mechanism such as illustrated in FIG. 9A is used.

The third stopping device 190 includes, as an engaged member, a bend bar 191 provided on the second arm 130, and a locking device 192 attached to the first arm 120. The locking device 192 includes an engager 194 that rotates around an axis of rotation 193 and that is capable of engaging with the bend bar 191, a release lever 196 that rotates around an axis of rotation 195, and a tension spring 197 that connects the engager 194 and the release lever 196 to each other.

Figure 9B:
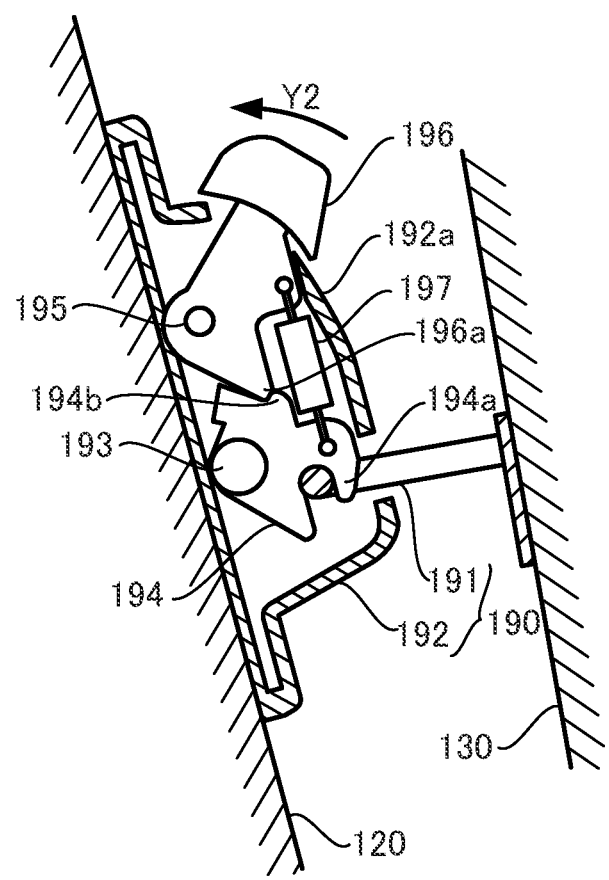
FIG. 9B is an overview drawing of the locking mechanism applicable to the camera stand illustrated in FIG. 1, and illustrates a case in which the locking mechanism is in a locked state.

In response to the second arm 130 being rotated by the user as indicated by arrow Y1 in order to store the camera stand 100, the engager 194 against which the bend bar 191 is eventually pressed rotates clockwise (in the drawing) around the axis of rotation 193. At this time, the release lever 196 that is connected to the engager 194 via the tension spring 197 rotates clockwise (in the drawing) around the axis of rotation 195 due to the rotation of the engager 194 and, as illustrated in FIG. 9B, eventually contacts a cover 192a that forms the outer surface of the locking device 192, thereby restricting further clockwise rotation. In response to the engager 194 being rotated clockwise (in the drawing) further against the urging force of the tension spring 197 from the aforementioned state, as illustrated in FIGS. 9A and 9B, a protrusion 194b of the engager 194 overcomes a tip 196a of the release lever 196. As a result, the tip 196a of the release lever 196 contacts the protrusion 194b, as illustrated in FIG. 9B. As a result, an operation sound (click sound) caused by the protrusion 194b of the engager 194 overcoming the tip 196a is emitted from the third stopping device 190. The user hears this operation sound and thereby can determine that the second arm 130 has moved to the stored position and can stop the rotating of the second arm 130.

Note that, in a case where, due to ambient sound, the operation sound emitted from the third stopping device 190 is not heard, the user will attempt to further rotate the engager 194. In such a case, the urging force of the tension spring 197, which is connected to the release lever 196 for which clockwise rotation is restricted, gradually increases and a large force is required to rotate the engager 194. The user can rotate the second arm 130 and fully press the bend bar 191 into the engager 194 with ordinary strength, thereby moving the second arm 130 to the stored position and locking the second arm 130 to the first arm 120.

By moving the second arm 130 to the stored position in this manner, as illustrated in FIG. 9B, a hook 194a of the engager 194 hooks on the bend bar 191. Additionally, due to the urging force of the tension spring 197, the engager 194 is subjected to a force in the direction of rotating counterclockwise (in the drawing). However, the protrusion 194b of the engager 194 is in a state pressed against the tip 196a of the release lever 196 for which rotation is restricted and, as such, counterclockwise (in the drawing) rotation of the engager 194 is restricted. Due to this configuration, a state in which the bend bar 191 is hooked by the hook 194a is maintained and the first arm 120 and the second arm 130 are engaged with each other via the third stopping device 190.

Meanwhile, to release this engaged state, a finger is hooked on the release lever 196 to rotate the release lever 196 in the direction indicated by arrow Y2, that is, to rotate the release lever 196 counterclockwise (in the drawing). As a result, the tip 196a of the release lever 196 overcomes the protrusion 194b, and the engagement between the tip 196a and the protrusion 194b described above is released. As a result, the engager 194 is pulled by the tension spring 197 so as to rotate in the counterclockwise (in the drawing) direction and, as illustrated in FIG. 9A the hook 194a separates from the bend bar 191. Thus, the state in which the first arm 120 and the second arm 130 are locked to each other is released.

By using this third stopping device 190 that includes the mechanical locking mechanism, the stored state is not released as long as the user does not operate the release lever 196 with clear intent to release the locked state. As a result, the arms (the first arm and the second arm) that are at the stored positions can be prevented from unintentionally rotating and projecting.

A configuration is possible in which the third stopping device 190 is used in place of at least one of the first locking device 180 and the second locking device 183. Additionally, a configuration is possible in which at least one of the first locking device 180 and the second locking device 183 is omitted and, in such a case, a rubber cushioning material may be disposed in place of the at least one of the first locking device 180 and the second locking device 183 to suppress the occurrence of impact or sound caused by at least one of contact between the corresponding supporter and the first arm and contact between the first arm and the second arm.

In a case where the camera stand 100 is in the stored state, whether the first arm 120 and the second arm 130 are disposed substantially parallel to each other can be determined as desired. For example, a configuration is possible in which an arrangement is employed in which the second locking device 183 is made higher or the auxiliary arm 123 is shortened, and spacing between the second arm 130 and the first arm 120 increases toward the one end side of the second arm 130 to which the camera 1 is attached. Due to this configuration, the first arm 120 and the attachment stand 140 can be made less likely to interfere in a case of placing the camera stand 100 in the stored state. Additionally, a configuration is possible in which an arrangement is employed in which the second locking device 183 is lowered or the auxiliary arm 123 is lengthened, and spacing between the second arm 130 and the first arm 120 decreases toward the one end side of the second arm 130 to which the camera 1 is attached. Even in a case of using configurations such as those described above, due to the gravity of the camera 1 or the gravity of the second arm 130, a moment in the direction of tilting to the first arm 120 side acts on the second arm 130 that is at the stored position, thereby enabling maintenance of the stored state of the camera stand 100.

A description is given in which, in a case where the camera stand 100 is in the stored state, the first arm 120 is in a state in which the one end side on which the second fulcrum 153 is provided is extended diagonally downward. However, a configuration is possible in which the first arm 120 assumes another attitude. For example, a configuration is possible in which, in a case where the first arm 120 is at the stored position, the first arm 120 assumes an attitude in which the side of the arm main body 121 on which the fourth fulcrum 152 is provided extends downward. Moreover, as described above, a configuration is possible in which the auxiliary arm 123 is lengthened and extended in the horizontal direction to tilt the second arm 130 that is at the stored position toward the first arm side with respect to the vertical direction. At this time, it is sufficient that the dimensions of the frame member 116 illustrated in FIG. 2 are made larger so that the arm main body 121 of the first arm 120 can assume the downward extended attitude. Moreover, it is sufficient that the first locking device 180 is provided at a position that operates (locks the first arm 120) in a case where the arm main body 121 is faced downward.

Whether to provide the auxiliary arm 123 can be determined as desired. For example, a configuration is possible in which the fourth fulcrum 152 is not provided, and the tip of the arm main body 121 is bent in the direction that the auxiliary arm 123 illustrated in FIG. 8 extends to provide the arm main body 121 with the functions of the auxiliary arm 123.

In the embodiment described above, a description is given in which the first arm 120 and the second arm 130 are disposed on substantially the same plane (on the XZ plane) that extends in the vertical direction. However, whether to dispose the first and second arms 120 and 130 on substantially the same plane can be determined as desired. For example, a configuration is possible in which a bend extending toward the Y-axis direction is formed on the one end of the first arm 120, and the second arm 130 is attached to this bend, thereby disposing the first arm 120 and the second arm 130 on mutually different planes. In such a case, the locking device that locks the first arm 120 and the second arm 130 may be configured by providing the magnet member 185 and the magnet receiver 184 so as to face each other along the Y-axis direction, or brackets that face each other in a case where the second arm 130 is at the stored position may be formed on the first arm 120 and the second arm 130 and the magnet member 185 and the magnet receiver 184 may be disposed on these brackets.

It is also described that the first arm 120 and the second arm 130 are rotatably supported around imaginary axes extending in the Y-axis direction, but movement modes of the arms are not particularly limited. For example, a mode is possible in which the imaginary axis serving as the rotation center of the first arm 120 and the imaginary axis service as the rotation center of the second arm 130 are orthogonal to each other. Thus, the orientations of the imaginary axes serving as the rotation centers can be set as desired.

It is also described that the first fulcrum 151 that supports the first arm 120 and the second fulcrum 153 that supports the second arm 130 allow rotation around imaginary axes, but how the first arm 120 and the second arm 130 are connected can be determined as desired. For example, a configuration is possible in which a universal joint capable of freely changing the connection angle is applied to at least one of the first fulcrum 151 and the second fulcrum 153.

In the camera stand 100, two arms, namely the first arm 120 and the second arm 130 are provided, but the number of installed arms can be set as desired, and a configuration is possible in which three or more arms are installed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A stand for a device, comprising:
   a supporter that includes a first fulcrum;
   a first arm that is coupled to the supporter so as to be rotatable within a first rotational range around the first fulcrum, and that includes a second fulcrum at one end thereof;
   a second arm that includes a first end and a second end, the first end being coupled to the first arm so as to be rotatable within a second rotational range around the second fulcrum, and the first arm and the second arm being movable with respect to each other via the second fulcrum;
   a locking device that secures the first arm and the second arm to each other in a state in which the first arm and the second arm are at positions within their respective rotational ranges at which the first arm and the second arm are substantially parallel to each other;
   a grip; and
   a joint that is coupled to the second end of the second arm and the grip, the joint being couplable to the device, and an orientation of the device with respect to the second arm being changeable by operation of the grip in a state in which the device is coupled to the joint,
   wherein in a state in which the second arm is at a position within the second rotational range toward a side of the first arm and the device is coupled to the joint, the grip is selectively movable to each of (i) a first position at which the device does not interfere with the first arm and the grip does interfere with the first arm, and (ii) a second position at which both the device and the grip do not interfere with the first arm.

2. The stand according to claim 1, wherein the joint is coupled to the second end of the second arm so as to be rotatable around a third fulcrum.

3. The stand according to claim 2, wherein:
   the grip is linkable to the device, and
   in the state in which the second arm is at the position within the second rotational range toward the side of the first arm, the grip is movable to each of the first position and the second position by at least one of (i) a first operation of rotating the joint around the third fulcrum and (ii) a second operation of changing an orientation of the device by rotation of the device via the joint.

4. The stand according to claim 1, wherein a cushioner is provided at a portion where the grip interferes with the first arm.

5. The stand according to claim 2, wherein a cushioner is provided at a portion where the grip interferes with the first arm.

6. The stand according to claim 3, wherein a cushioner is provided at a portion where the grip interferes with the first arm.

7. The stand according to claim 1, wherein the joint is a ball joint.

8. The stand according to claim 1, wherein the locking device comprises:
a magnet member provided on the second arm; and
a magnet receiver provided on the first arm and configured to receive the magnet member.

9. The stand according to claim 8, wherein the magnet receiver and the magnet member are opposite each other in the state in which the second arm is at the position within the second rotational range toward the side of the first arm.

10. The stand according to claim 8, wherein the magnet receiver and the magnet member contact with and are secured to each other in the state in which the first arm and the second arm are substantially parallel to each other.

11. The stand according to claim 8, wherein the supporter comprises a frame member, the frame member including plural projections that support the first fulcrum at an intermediate portion of the frame member.

12. The stand according to claim 11, wherein:
the supporter further comprises an upright portion to which the frame member is coupled, and
the stand further comprises a second locking device that secures the first arm and the upright portion to each other.

13. The stand according to claim 1, wherein the first fulcrum supports the first arm at a position of the first arm between respective ends thereof.

14. The stand according to claim 1, wherein the first arm comprises:
an arm main body which is supported by the first fulcrum and to which the second arm is coupled; and
a counterweight provided on an end of the arm main body opposite an end of the arm main body to which the second arm is coupled.

* * * * *